United States Patent [19]

Habing et al.

[11] Patent Number: 5,661,578
[45] Date of Patent: Aug. 26, 1997

[54] COLOR LIQUID CRYSTAL DISPLAY BACKLIGHT SYSTEM FOR NIGHT VISION IMAGING SYSTEM COMPATIBILITY

[75] Inventors: Robert D. Habing; Armand R. Losinski, both of Albuquerque, N. Mex.; Larry A. Nelson, Bellevue, Wash.; Teddy J. Wood, Corrales, N. Mex.

[73] Assignee: Honeywell Inc., Minneapolis, Minn.

[21] Appl. No.: 97,521

[22] Filed: Jul. 27, 1993

[51] Int. Cl.$^6$ .......................... G02F 1/1335; G01D 11/28
[52] U.S. Cl. .................. 349/65; 362/27; 362/30; 349/70
[58] Field of Search .................. 359/48, 49, 50; 362/26, 27, 29, 30, 31

[56] References Cited

U.S. PATENT DOCUMENTS

| 4,630,895 | 12/1986 | Abdala et al. | 362/31 |
| 4,655,553 | 4/1987 | Klein | 359/53 |
| 4,722,028 | 1/1988 | Brannon | 362/29 |
| 4,887,189 | 12/1989 | Garrett | 362/27 |
| 5,032,007 | 7/1991 | Silverstein et al. | 359/49 |
| 5,143,433 | 9/1992 | Farrell | 362/29 |
| 5,211,463 | 5/1993 | Kalmanash | 362/26 |
| 5,285,298 | 2/1994 | Kaneko | 359/43 |

FOREIGN PATENT DOCUMENTS

| 0 375 293 A2 | 6/1990 | European Pat. Off. . | |
| 6-175127 | 6/1994 | Japan | 359/48 |

*Primary Examiner*—William L. Sikes
*Assistant Examiner*—Tiep H. Nguyen
*Attorney, Agent, or Firm*—Kenneth J. Johnson; Ronald E. Champion

[57] ABSTRACT

The disclosure is directed to a color liquid crystal display backlight system for daytime and nighttime use. Night vision imaging system retirements are met so that light emissions from the 630 nm to 930 nm range are substantially reduced or eliminated. Separate daytime and nighttime light sources are utilized. The NVIS compatible nighttime source is positioned to be out of sight of a user and produces an appropriately filtered, substantially collimated beam which diffusively reflects from the inside walls and base of the display housing before it illuminates the display surface. Intensities of both daytime and nighttime light sources can be controlled.

12 Claims, 3 Drawing Sheets

COLOR LIQUID CRYSTAL DISPLAY BACKLIGHT SYSTEM FOR NIGHT VISION IMAGING SYSTEM COMPATIBILITY

BACKGROUND OF THE INVENTION

1. Field of the Invention

The invention relates to a color liquid crystal display (LCD) backlight system for night vision imaging system (NVIS) compatibility, which limits the nighttime emissions from the color display between 450 and 930 nanometers (nm), particularly 630 nm and 930 nm, while maintaining the largest color spectrum possible in the normal daylight mode of operation.

2. Discussion of the Prior Art

NVIS compatibility is frequently required in military aircraft. Night vision compatibility requires that during nighttime operation the intensity of emissions from a color display must be controlled within the spectral range of 450 nm to 930 nm, especially between 630 nm to 930 nm.

The invention provides an apparatus which meets NVIS compatibility for active matrix LCDs while maintaining the largest color gamut possible in a normal daylight mode of operation.

A backlight is necessarily utilized to illuminate for viewing color active matrix LCDs. Avionics applications require high luminance for such displays to be readable under high ambient lighting conditions present during daylight operations and lower luminance for nighttime operations. Typical prior art LCD systems rely on light source dimming and filtering to minimize the emissions therefrom between 630 nm and 930 nm during nighttime operations.

In cockpit displays, daytime luminance requirements range from approximately 100 Foot Lamberts (FL) for transport aircraft to 250 FL for fighter aircraft. Since a typical LCD transmits only 2 to 4.5 percent of the light impinging thereon, daylight luminance requirements for the backlight are very high. In order to produce 100 to 250 FL at 2 to 4.5 percent transmission, the backlight output for daylight operation must be 20 to 50 times as high, 2,000 to 12,500 FL, since only 1/20 to 1/50 of the light is actually transmitted by the LCDs.

In contrast to the high light output requirements for daylight displays, nighttime displays must operate at very low luminance levels; 0.1 FL or lower are frequently required. It will be apparent to those skilled in the art that the dynamic range of the backlight is greater than 2,500 to 1. With the high luminance requirements for daylight operation, it is easy to see that losses in the optical system must be minimized.

Fluorescent lamps are the dominant lighting source for active matrix LCDs. Such lamps exhibit high luminance efficacy and moderate flexibility in packaging. With appropriate geometric design, fluorescent lamps can provide the dynamic range required. Such a lamp, in conjunction with an efficient lighting cavity, can produce a uniform light source suitable for daylight use with an LCD.

Unfortunately, fluorescent lamps have unwanted spectral emissions in the 630 nm to 930 nm range. These emissions come from the phosphors, the arc and the cathodes of the lamp, whether the lamps are hot or cold cathode lamps. Such emission sources are of sufficient intensity to violate the requirements of current military (NVIS) specifications. An additional difficult factor is that although an LCD's transmission is less than 5 percent for visible light, it is nearly 50 percent for light within the 700 nm to 900 nm range.

Some prior art systems provide NVIS compatibility by placing a filter between the fluorescent backlight and the LCD. This filter must absorb or reflect the lamp emissions in the 630 nm to 930 nm range while transmitting light within the visible range. Several disadvantages must be accepted when using total backlight filtering. First, the added optical error of the filter in the light path creates losses due to absorption. This requires more light be generated from the fluorescent source in order to provide the additional feature of NVIS compatibility. Second, the chromaticity of the LCD is limited, because 630 nm is well within the visible red spectrum. In other words, part of the red in the display is lost. Hence, filtering the backlight for NVIS compatibility limits the color in the red area for normal daylight operation so that the red appears to be less saturated or more orange in color. Such NVIS filters typically comprise absorptive glasses or dichroic hot mirrors. Although the absorptive glasses do a fairly good job of absorbing emissions in the 630 nm to 930 nm band, the transition from the transmission to the absorption band is gradual; the transmission to absorption transition region severely penalizing the red transmission.

Dichroic mirrors can alternatively be used and can provide high transmission with sharp cut-off filtering, thereby allowing for better red transmission. However, dichroic mirrors are very angle sensitive. A hot mirror coating may have a cut-off frequency at 630 nm at normal viewing, but will shift to a cut-off frequency of 500 nm when viewed at a 45° angle, providing a filter which removes essentially all the red for a 45° viewing angle.

SUMMARY OF THE INVENTION

In accordance with the present invention, there is provided a flat color avionics display apparatus having high light level and low light level operating modes. The apparatus comprises a housing having a substantially flat base and a flat multi-color display surface generally parallel to the base and spaced therefrom by a wall which circumferentially surrounds the base and the display surface. The inside surfaces of the base and the wall are coated with a diffuse reflective coating so as to diffusely reflect light impinging thereon. A first light source is positioned within the housing for illuminating the multi-color display surface with relatively high illumination in the high light level mode. A second illumination source is positioned within the housing for illuminating the multi-color display surface in the low light level mode. The second source comprises a generally longitudinal source of light disposed adjacent part of the wall a selected amount from the base. The second source is positioned to emit light in a generally parallel direction spaced from and over the diffuse reflective surface of the base. The wall spaces the base and the display surface sufficiently far apart from one another to provide acceptable diffuse illumination of the display surface through a diffuser layer when the second source is operated in the low-light-level mode as well as sufficiently even illumination for daylight viewing when the first light source is utilized.

The light from the second source is preferably diffusely reflected from the wall at least twice before it impinges on the display surface to assist to substantially uniformly and diffusely illuminate the multi-color display surface with sufficient intensity to provide a viewable multi-color display thereon.

The second source can comprise a cold cathode fluorescent lamp with a lens, such as a fresnel lens, positioned to direct light generated by the lamp above and parallel to the surface of the base. The second source is preferably filtered to be NVIS compatible prior to entering the housing. In one embodiment, the second source comprises a relatively straight longitudinal lamp and the walls comprise substantially flat elements, forming a closed polygon having substantially flat sides, the second source being disposed adjacent one of the sides of the polygon. The polygon can comprise a rectangle, square or other closed shape. Alternatively, the walls can comprise an oval or circular shape, and the lamp an arcuate shape.

One object of the present invention is to provide a substantially full spectrum color display under both nighttime and daylight conditions.

Another object of the invention is to preserve good red color on a display during daylight conditions.

An advantage of the invention is that since no NVIS filter over the entire display is used, the daylight source intensity can be lower, requiring less power.

Another advantage of the invention is that substantially full color is preserved in the display, even when viewed at various angles.

Yet another advantage is that the light from the second source is substantially collimated along one axis which reduces any color shift.

Another advantage is that the filter for nighttime use is small relative to the size of the display resulting in cost reduction and manufacturing ease.

Still another advantage is that an increased dimming range is provided because the second source can be used for very low light levels and NVIS modes.

Other objects, features and advantages of the invention will become apparent to those skilled in the art from the description of the preferred embodiment, claims and drawings hereof, wherein like numerals refer to like elements.

DESCRIPTION OF THE PREFERRED EMBODIMENT

Figure 1:
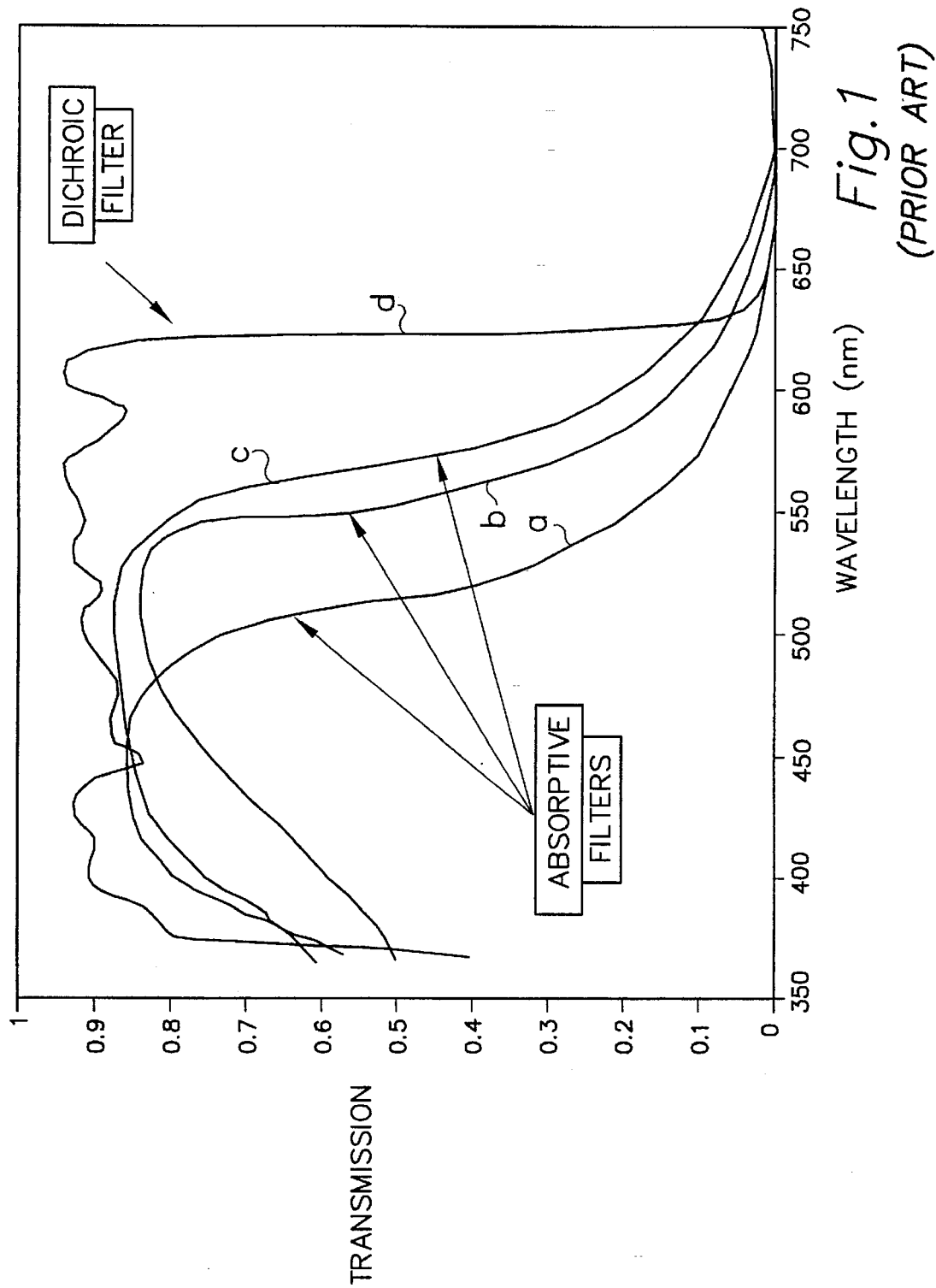
FIG. 1 illustrates filtered transmissions from absorptive and dichroic filters as used in the prior art.

FIG. 1 shows the filtering results of representative prior art absorptive filters in lines a, b, and c, and a reflective dichroic filter in line d. Such filters are typical of those used in prior art devices. The results shown are for a viewer position directly in front of the display. The dichroic mirror, as seen in line d, provides high transmission below and sharp cutoff of light transmission above 600 nm. However, dichroic mirror filters are very angle sensitive and most of the red is lost at a 45° viewing angle. The slow transition of the absorptive glasses of lines a, b, and c penalizes red transmission no matter what the viewing angle.

Figure 2:
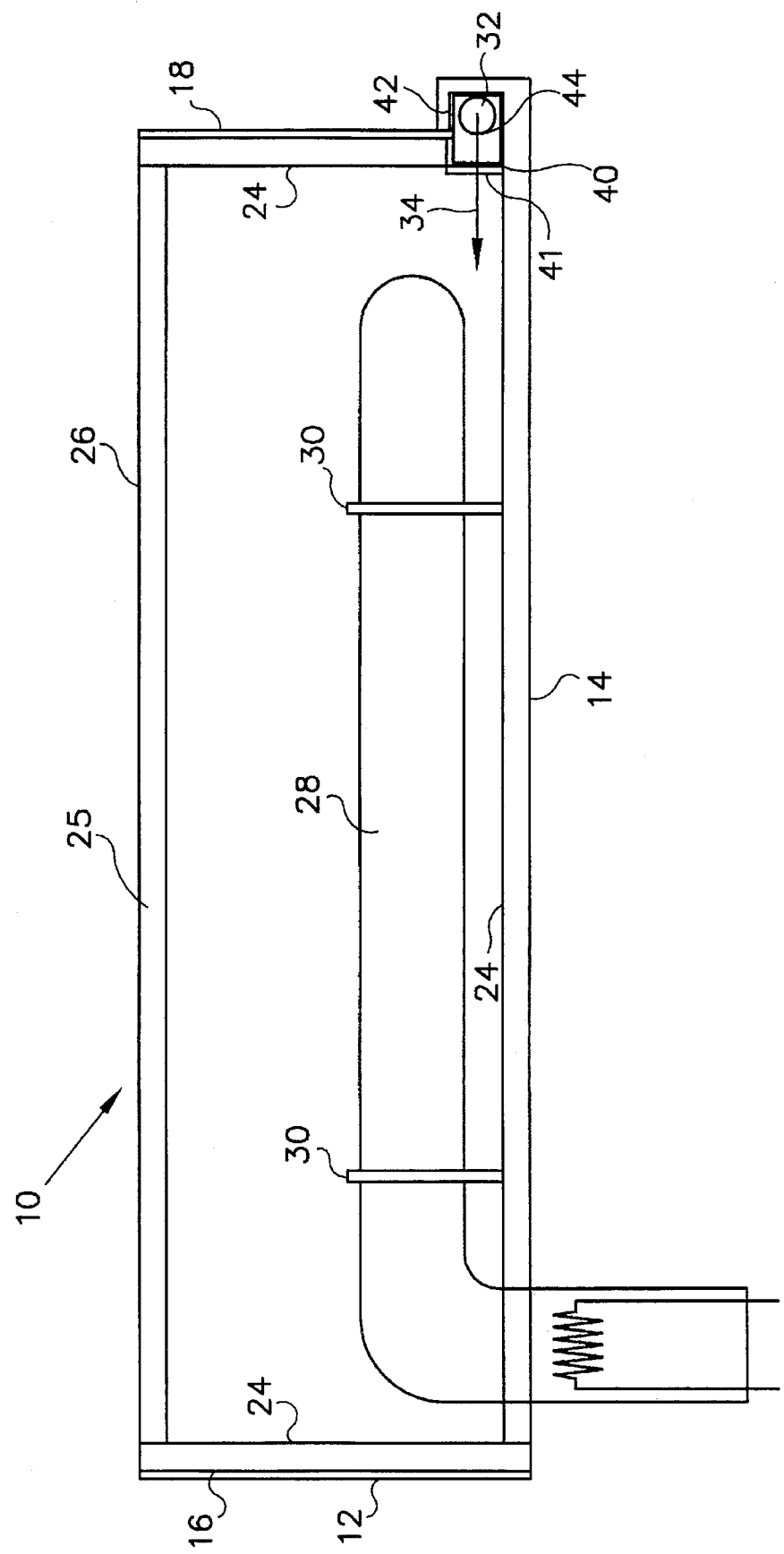
FIG. 2 is a side cutaway view of a preferred embodiment of the invention.
Figure 3A:
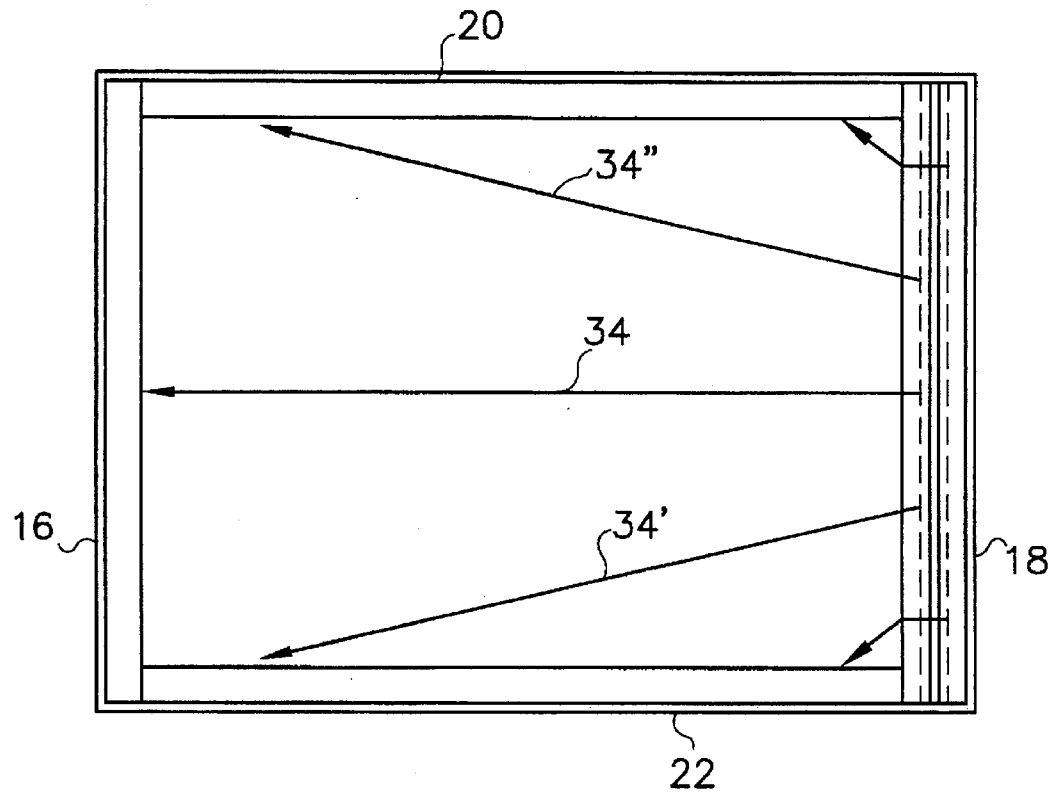
FIG. 3a is an open top view of the preferred embodiment of the invention.
Figure 3B:
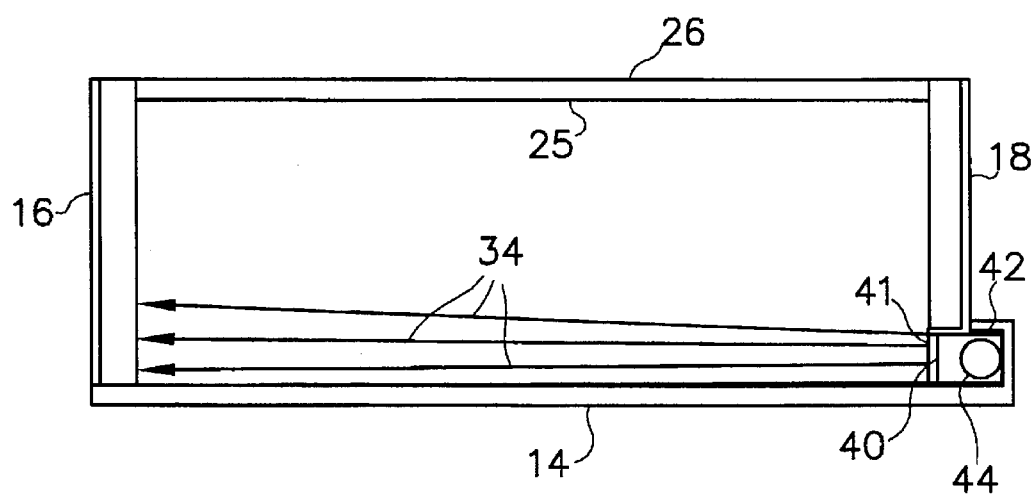
FIG. 3b is a cutaway side view of the preferred embodiment illustrating how the light is emitted essentially parallel to the base from the nighttime light source.

Reference is now made to FIG. 2, which shows a side cutaway view of a preferred embodiment of the invention 10 comprising a rectangular housing 12, having a base 14 and walls 16, 18, and 20 and 22, all shown in FIGS. 3a and 3b. The inside surfaces of the base and the walls are covered with a diffusively reflective coating 24.

Atop a diffuser layer 25, a display surface 26 comprising liquid crystal display elements is spaced from base 14, preferably substantially parallel thereto, by walls 16, 18, 20 and 22, to form a cavity containing a first light source 28 for daylight use which comprises in the preferred embodiment a serpentine hot cathode fluorescent tube capable of approximately 8,000 FL of luminance.

It will be appreciated by those skilled in the art that the light source 28 used under daylight conditions may comprise one of any number of readily available sources providing adequate illumination for daylight viewing, such as a hot or cold cathode fluorescent or an incandescent source of light.

In the preferred embodiment, brackets 30 position serpentine bulb 28 above and parallel to the base 14. Light source 28 is operated by a switch (not shown) and from an energy source (not shown). The intensity of source 28 may be controlled by a rheostat or other variable power control means (not shown) so that a pilot may adjust the output of light 28 and thereby the intensity of the illumination on the display surface 26 in accordance with the intensity of the ambient light in the aircraft cockpit. For example, at noon the illumination would preferably be higher than during twilight conditions, overcast or nighttime conditions. The intensity of source 28 in the preferred embodiment can be reduced sufficiently for normal nighttime use. Light source 28 provides a diffuse and relatively even illumination of viewing surface 26 through the diffuser layer 25. In practicing the invention, it is important that the reflective surface coating 24 diffusively reflect light within the visible spectrum and that little or no light be lost from the cavity so that relatively even illumination will be provided across essentially the entire display surface 26.

When NVIS compatibility is desired, a second source of light 32 is utilized. A power source, switch and intensity control (not shown) are provided. In the preferred embodiment, light source 32 comprises a longitudinal cylindrical cold cathode fluorescent lamp which has a reflective coating wrapped about its phosphor, except for a fairly narrow longitudinal, clear light transmitting aperture 44 along the length of the lamp through which light is emitted from the lamp. In the preferred embodiment, the lamp is rotationally disposed so that the light is emitted from aperture 44 in the direction shown by arrow 34 generally parallel to the base 14.

Light exiting aperture 44 is preferably focused by a lens 40, which in the preferred embodiment is a clear plastic fresnel lens, the focused light preferably being filtered by a filter 41 to meet NVIS standards. However, those skilled in the art will recognize that other types of lenses made from various materials may be used and that combinations of lenses may be used if desired. However, the fresnel lens of the preferred embodiment can be inexpensively constructed of commonly available plastic and is effective for practicing the invention. The filter 41 can be a coating on lens 40 or a separate component as a matter of choice to a user. One of the unique features of the invention is that only the second light source 32 need be filtered since light source 28 is only for daylight use.

A very significant feature of the invention is that in accordance therewith, light being emitted from the second source 32 is not directly viewable by the user. Indeed, even the view of the first reflection therefrom is minimized in order to provide substantially uniform illumination of surface 26 through diffuser layer 25. Therefore, as better seen in FIGS. 3a and 3b, the light emitted from source 32 is focused through lens 40 and filter 41, and following the directions of arrows 34, 34' and 34", initially impinges upon the diffusively reflective coating 24 on walls 16, 20, and 22. The walls diffusively reflect the light over many directions until the light eventually impinges upon and emerges through diffuser layer 25 from viewing surface 26, generally evenly distributed thereon. As will be noted, the light source 32 is disposed just behind wall 18 so that it is not directly viewable by the user and is essentially enclosed within a three-sided longitudinal box having an upper side 42 blocking any view of the aperture 44.

FIG. 3b shows the substantially parallel nature of the light beams 34 as emitted by source 32 through lens 40.

Although the preferred embodiment illustrated has a rectangular box-like configuration, those skilled in the art will appreciate that the display surface may be otherwise configured and could be, e.g., a closed polygon, oval or circular or have flat sides and arcuate sides. The height or depth of the walls should be sufficient to allow adequate diffusive reflections (at least two) of the light generated from source 32 so that the user will not see a light source image on the display surface 26. Indeed, the user sees very little initial reflection from source 32, but rather substantially uniform illumination of diffuser layer 25 and display surface 26 in both daylight and nighttime modes. In a large scale model prototype, the depth of the wall is approximately 2 inches, and the size of the display is 6 inches by 8 inches.

Although in the preferred embodiment light source 32 comprises a cold cathode fluorescent bulb longitudinally straight and having a reflective coating, except for longitudinal aperture 44 therein, those skilled in the art will appreciate that other light sources such as light emitting diodes (LEDs) or incandescent lamps could also be utilized. An arcuate nighttime light source can be used on an arcuate walled device.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

The embodiments of the invention in which an exclusive property or right is claimed are defined as follows:

1. A color avionics flat display apparatus having high light level and low light level operating modes, said apparatus comprising:

a housing comprising a substantially flat base, a multi-color liquid crystal display surface disposed over a diffuser layer generally parallel to said base and spaced therefrom by wall means which circumferentially surround said display surface, said base and wall means comprising diffusely reflective inside surfaces, said housing being substantially light tight throughout;

first means positioned within said housing for illuminating said multi-color display surface through said diffuser layer with relatively high illumination in the high light level mode; and second means positioned within said housing for illuminating said multi-color display surface in the low light level mode, said second means comprising a generally longitudinal source of light disposed adjacent part of said wall means at a selected distance from said base and positioned to emit light behind said first means relative to the display surface and in a generally parallel direction over said diffuse reflective surface of said base, said wall means spacing said base and said display surface sufficiently far apart from one another to provide acceptable diffuse illumination of said surface display when said second illumination means is operated in the low light level mode, wherein during said low light level mode said generally longitudinal light source emits light parallel to, spaced from, and across said base, said light being received by and diffusely reflected from said wall means, so that base and wall means reflect substantially uniform diffuse light to illuminate said multi-color display surface through said diffuser layer with sufficient intensity to provide a viewable multi-color display thereon.

2. The invention of claim 1 wherein said second means comprises a cold cathode fluorescent lamp and lens means disposed to direct light generated by said lamp over and parallel to the base.

3. The invention of claim 2 wherein said lens comprises a generally longitudinal fresnel lens.

4. The invention of claim 1 wherein said second means comprises a night vision imaging system and a filter means.

5. The invention of claim 4 wherein said filter means is night vision imaging system compatible.

6. The invention of claim 1 wherein said second illuminating means comprises a relatively straight longitudinal lamp.

7. The invention of claim 6 wherein said wall means comprise substantially flat elements, said elements forming a closed polygon having substantially flat sides.

8. The invention of claim 7 wherein said closed polygon comprises a rectangle.

9. The invention of claim 1 wherein said second illuminating means comprises a somewhat arcuate longitudinal lamp.

10. The invention of claim 1 wherein said first illuminating means comprises a serpentine hot cathode fluorescent lamp.

11. The invention of claim 10 further comprising means for adjustable controlling intensity of said hot cathode lamp.

12. The invention of claim 1 wherein said longitudinal source of light is disposed to be out of view of a user of the display apparatus.

* * * * *